UNITED STATES PATENT OFFICE.

HUGO HENRY HANSON, OF BOSTON, MASSACHUSETTS, ASSIGNOR TO BERLIN MILLS COMPANY, OF BERLIN, NEW HAMPSHIRE, A CORPORATION OF MAINE.

CLOTH FOR FILTER-PRESSES.

1,222,100.      Specification of Letters Patent.      Patented Apr. 10, 1917.

No Drawing.      Application filed July 8, 1916. Serial No. 108,250.

*To all whom it may concern:*

Be it known that I, HUGO HENRY HANSON, a subject of the King of Sweden, residing at Boston, in the county of Suffolk and State of Massachusetts, have invented new and useful Improvements in Cloths for Filter-Presses, of which the following is a specification.

This invention relates generally to filter presses, but more particularly to the filtering cloths which are used therein, to permit the percolation of a liquid therethrough and to retain the solid matter which may have been in suspension.

In certain mechano-chemical processes it it necessary to subject certain caustic mixtures to filtration, such for example in removing calcium carbonate from a solution of sodium hydroxid in preparing the liquor for use in the manufacture of wood pulp. All organic fibers are weakened and finally destroyed by strong caustic alkali, particularly animal fibers such as wool. Vegetable fiber, such as linen and cotton, are more resistant than animal fiber, and are therefore generally used for purposes of filtration although cloths made therefrom must frequently be replaced. After extended work and investigation, I have found that filter cloths made of cotton or linen may be so treated as greatly to prolong their lives even though employed for filtering strong caustic alkali. In accordance with my invention, the cloths are saturated or impregnated with a compound which will guard them from corrosion for a relatively long time, without affecting the porosity thereof. Various substances may be used for this purpose. I have found that rubber will serve the purpose, although rubber itself is acted on in time if the caustic solution is heated to a high temperature. The rubber must be in solution when used, so that it will penetrate the threads of which the cloth is made, and not close the pores or interstices between the threads. I employ a rubber cement,—pure rubber dissolved. For the solvent I use turpentine, as this leaves the rubber in a condition in which it will penetrate the fibers without forming a coating on the threads or filling the interstices between the threads. For a portion of the turpentine, I may substitute gasolene, and, in fact, I have found that by adding to a rubber cement, made of rubber and gasolene, a certain amount of turpentine, to dilute it to the consistency of a thin paint, a solution results which serves the purpose satisfactorily.

The cloths are either dipped into the solution or are painted therewith. Several coats are usually necessary, each being permitted to dry before the next is applied. By treatment as described, the durability of the cloths is greatly increased without impairing the filtering properties thereof.

It will be understood that other caustic-alkali-resistant materials may be used, if desired, and that, when rubber is employed, other solvents than turpentine may be used therefor.

Having thus explained the nature of my said invention, and described a way of making and using the same, although without attempting to set forth all of the forms in which it may be made or all of the modes of its use, what I claim is:

1. A filter cloth for filtering liquids, said cloth being impregnated with a material resistant to caustic alkali, whereby the component threads are rendered non-corrosive.

2. A filter cloth for filtering liquids, said cloth consisting of a textile fabric, the threads of which are impregnated with a substance resistant to caustic alkali.

3. A filter cloth for filtering liquids, said cloth consisting of a textile fabric, the threads of which are impregnated with rubber.

In testimony whereof I have affixed my signature.

HUGO HENRY HANSON.